United States Patent [19]

Nakamura et al.

[11] Patent Number: 4,477,877
[45] Date of Patent: Oct. 16, 1984

[54] COORDINATE DETERMINING DEVICE

[75] Inventors: Kohichi Nakamura; Yoshiyuki Morita, both of Tokyo, Japan

[73] Assignee: Seiko Instruments & Electronics Ltd., Tokyo, Japan

[21] Appl. No.: 272,290

[22] Filed: Jun. 10, 1981

[30] Foreign Application Priority Data

Jul. 10, 1980 [JP] Japan .................................. 55-94357

[51] Int. Cl.³ ...................... G08C 21/00; G06F 15/20
[52] U.S. Cl. ...................................... 364/571; 178/18; 178/19; 364/556
[58] Field of Search ...................... 364/556, 474, 571; 340/365 C; 178/18; 177/211

[56] References Cited

U.S. PATENT DOCUMENTS

| | | | |
|---|---|---|---|
| 3,873,770 | 3/1975 | Ioannov | 178/18 |
| 4,009,338 | 2/1977 | Dym et al. | 178/18 |
| 4,018,989 | 4/1977 | Snyder et al. | 178/18 |
| 4,205,199 | 5/1980 | Mochizuki | 178/18 |
| 4,298,772 | 11/1981 | Kobayashi et al. | 178/18 |
| 4,319,078 | 3/1982 | Yokoo et al. | 178/18 |

Primary Examiner—Felix D. Gruber
Attorney, Agent, or Firm—Robert E. Burns; Emmanuel J. Lobato; Bruce L. Adams

[57] ABSTRACT

A coordinate determining device comprised of a tablet having a plurality of sensing lines disposed thereon, and a magnetic field generator positionable relative to the sensing lines for indicating the coordinates of the magnetic field generator position. Detecting circuitry detects induced electromotive voltages from the sensing lines, and an arithmetic control unit computes the position of the magnetic field generating coordinate indicator and corrects for position errors caused by inclination of the magnetic field generating coordinate indicator relative to the tablet having the sensing lines disposed thereon.

5 Claims, 5 Drawing Figures

COORDINATE DETERMINING DEVICE

BACKGROUND OF THE INVENTION

The present invention relates to a coordinate determining device using an electromotive voltage induced by an alternating magnetic field, and more particularly to a coordinate determining device provided with an arithmetic control unit which compensates for an error caused by the inclination of a coordinate indicator.

In the conventional coordinate determining device, a coordinate indicator which generates an alternating magnetic field is positioned adjacent sensing lines and the position of the coordinate indicator on a tablet is computed by using the ratio of a difference between the maximum value of induced signals generated in a plurality of the sensing lines installed on the tablet spaced from each other and each of the induced signals of the sensing lines neighboring the sensing line in which the maximum value of the induced signal is generated. However, in the above mentioned type of device, the computed position is different from the actually indicated position if the pen-shaped coordinate indicator is inclined relative to the tablet.

SUMMARY OF THE INVENTION

Accordingly, it is an object of the present invention to eliminate the above noted drawbacks and provide a coordinate determining device for compensating for the error of computation caused by an inclination of a coordinate indicator of the device. Arithmetic control means computes a parameter indicative of error caused by inclination of the coordinate indicator. The parameter is computed by dividing the difference between the secondary peak values generated by the inclination of the coordinate indicator by the sum thereof and the computed parameter corresponds to the error caused by the inclination of the coordinate indicator. A memory circuit stores different parameter values and position errors corresponding to the respective different parameter values for providing the position error when the value of the parameter is calculated.

DETAILED DESCRIPTION OF THE INVENTION

Figure 1:
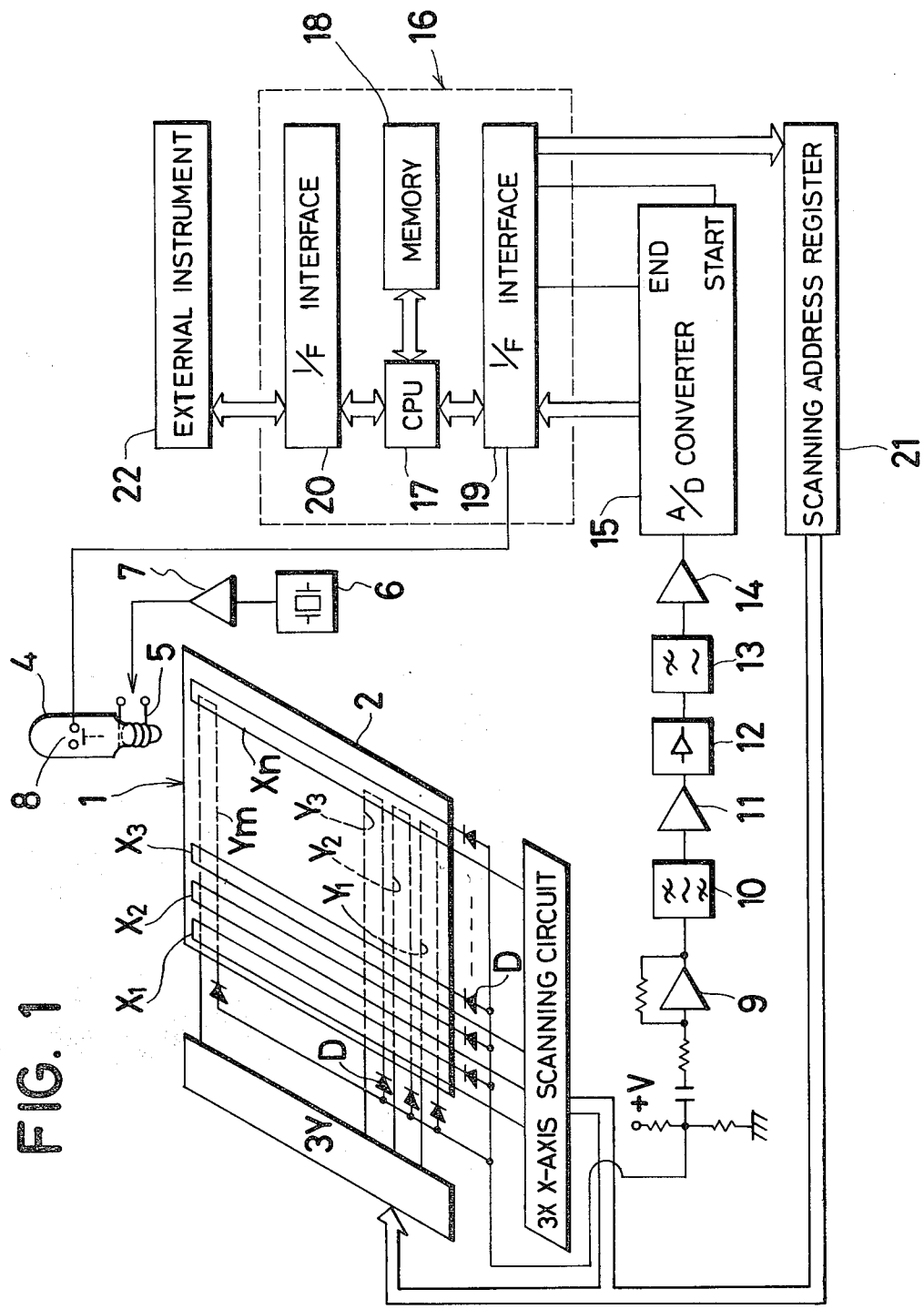
FIG. 1 is a block diagram showing an embodiment of the present invention.

Hereinafter the preferred embodiment of the present invention will be illustrated in conjunction with the drawings. FIG. 1 shows a block diagram of the present invention, in which numeral 1 represents a tablet, 2 represents an insulating substrate and 3X and 3Y represent scanning circuits for the X-axis and Y-axis which scan X-axis sensing lines $X_1$, $X_2$, $X_3$ ... $X_n$ and Y-axis sensing lines $Y_1$, $Y_2$, $Y_3$, ... $Y_m$ alternately in turn.

A coordinate indicator 4 of pen-shape including an exciting winding 5 receives a signal from a quartz crystal oscillator 6 by way of an amplifier 7 and produces a data signal by a pen switch 8. Numeral 9 represents an amplifier, 10 represents a band-pass filter, 11 represents an amplifier, 12 represents a commutating circuit, 13 represents a low-pass filter, 14 represents an amplifier and 15 represents an A/D converter. An induced signal of each sensing line passed through the above circuits is fed to an arithmetic controller (arithmetic control unit) 16.

The arithmetic controller 16 is comprised of a microprocessor 17, a memory circuit 18, and interfaces 19 and 20, and controls the scanning circuits 3X and 3Y by way of a scanning address register 21 and produces a coordinate signal applied to an external instrument 22 by an output signal from the pen switch 8 incorporated in the coordinate indicator 4. The principle of operation of the coordinate determining device according to the present invention will be described as follows.

Figure 3:
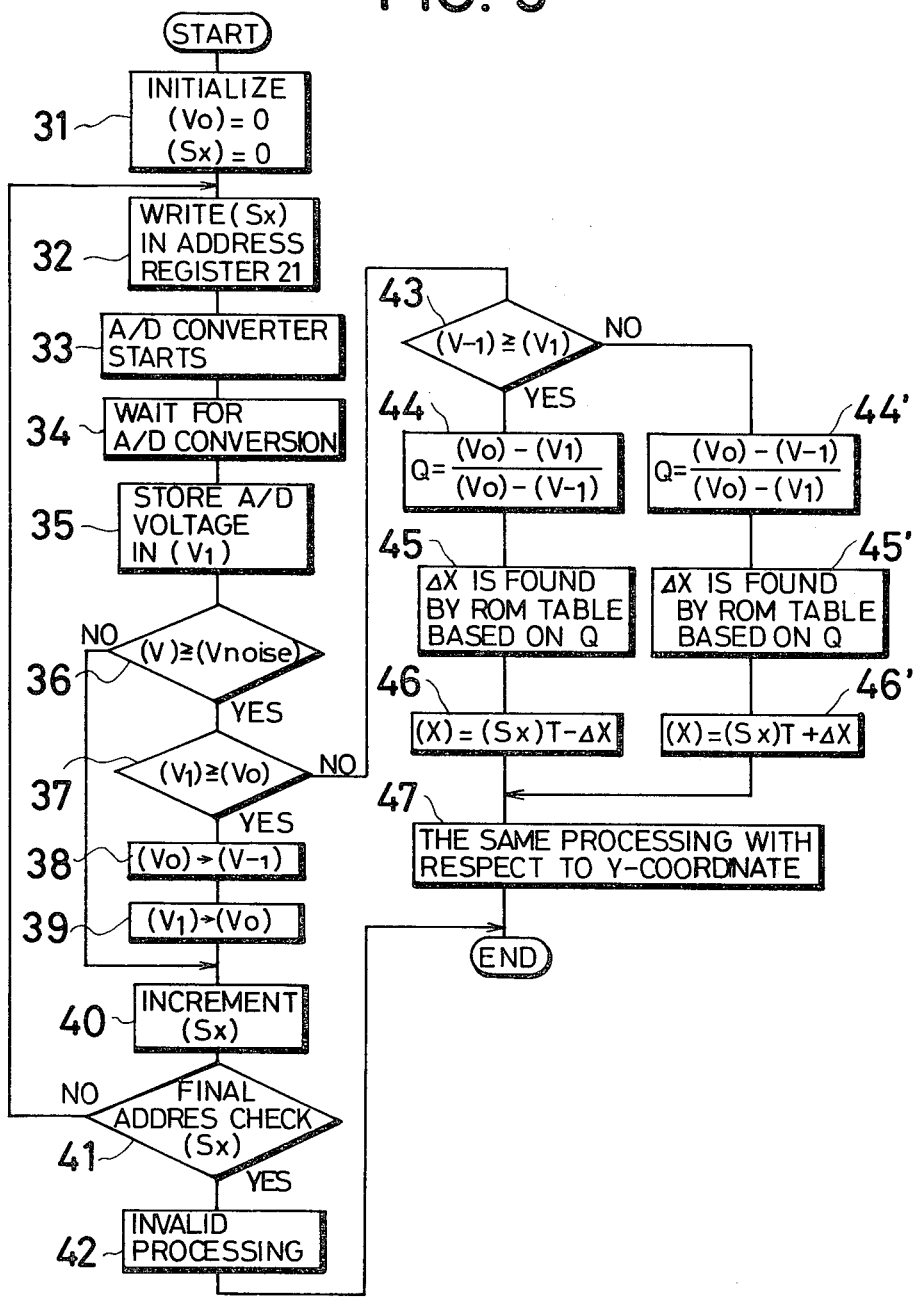
FIG. 3 is a flow chart showing the principle operation of the arithmatic controller.

FIG. 3 is a flow chart showing the content of the coordinate detection routine. The operation of the arithmetic controller 16 will be illustrated.

An initializer routine at the step 31 is performed to set registers ($V_0$) and ($S_x$) inside the computation controller 16 at "zero". The content "zero" of the register ($S_x$) is written in the address register 21 at the next step 32, by which the scanning signal is applied to the sensing line $X_1$, and the detection voltage $v_1$ obtained in the sensing line $X_1$ is fed to the A/D converter 15. At the step 33, the A/D converter 15 starts to convert the detection voltage input. The conversion ending signal from the A/D converter 15 is waited for during the next step 34, and after the conversion is ended, the detection signal $V_1$ converted digitally is read at the step 35 to be stored in the internal register ($V_1$). At the step 36, the content of the register ($V_1$), i.e. the detection voltage $v_1$ is compared with a predetermined threshold value (slightly larger than the noise level). If ($V_1$) is smaller than ($V_n$), i.e. ($V_1$)<($V_n$), the operating sequence jumps to step 40, and if ($V_1$) is equal to or larger than ($V_n$), i.e. ($V_1$)≧($V_n$), the ($V_1$) value is compared with the ($V_0$) value at the step 37. Since the ($V_0$) value is zero as illustrated above, initially ($V_1$)≧($V_0$) is judged. On this occasion, ($V_0$) value is shifted to the register ($V_{-1}$) at the step 38, and ($V_1$) value is shifted to the register ($V_0$) at the step 39. The X-axis sensing line address ($S_x$) is incremented at the step 40, and ($S_x$) is checked whether or not it is the final address of the X-axis sensing line at the step 41. The scan is fed back to the step 32 until the ($S_x$) becomes the final address of the X-axis sensing line. The scan of the X-axis proceeds in the manner just illustrated.

If the coordinate indicator 4 for generating the alternating magnetic field is not positioned on the tablet 1, the scan proceeds to the final address of the X-axis since the detection voltage is lower than the threshold value ($V_n$). Then the operation is judged YES at the step 41 and an invalid process routine at the step 42 is performed, so that an invalid signal is produced to the external instrument to light on lamps and the like.

When the coordinate indicator 4 indicates a certain position on the tablet 1, the detection voltage increases as the scan of the X-axis approaches the indicated position and the detection voltage decreases if the scan of the X-axis passes over the indicated position. The above mentioned variation of the detection voltage is detected at the step 37. Namely, the maximum value is constantly stored in the register ($V_0$) when the detection voltage increases, and if the newest detection voltage ($V_1$) is less than ($V_0$), the judgement "NO" is produced at the step 37. On that instant the maximum value of the detection voltage is stored in the register (V₀). And the detection voltage from a sensing line $X_{i-1}$, which is one address before the sensing line $X_i$ which generates the maximum value, is stored in the register ($V_{-1}$). And the detection voltage from the sensing line $X_{i+1}$, which is one address after the sensing line $X_i$, is stored in the register ($V_{+1}$).

When the operation is judged "NO" at the step 37, the operation is advanced to the step 43 to compare the value of ($V_{-1}$) with the value of ($V_{+1}$). The voltage ratio Q of the equation $$Q = \frac{V_{PX} - V_{P+1X}}{V_{PX} - V_{P-1X}} \left( Q = \frac{V_{PX} - V_{P-1X}}{V_{PX} - V_{P+1X}} \right)$$

is computed at the step 44 or 44' in compliance with the above comparison. At the next step 45 or 45', the interpolating distance ΔX represented by the linear equation Q=G(ΔX) (0≦Q≦1, 0≦X≦T/2, T is the distance of each sensing line) is found by the interpolating function table (what is called ROM table) based on the calculated Q value. Then the X coordinate is computed by the interpolating distance ΔX and the sensing address which generates the maximum value, and stored momentarily in the given register at the step 46 or 46'. Then the X coordinate detecting control is performed with respect to the Y coordinate to find the Y coordinate of the indicated position and memorized momentarily in the register as shown by the step 47. The step 47 includes the same invalid process routine as the step 42.

Figure 2:
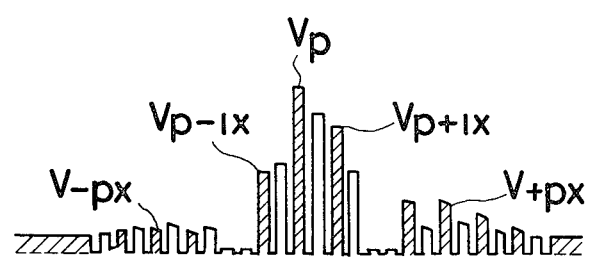
FIG. 2 is a waveform chart of an inductive signal produced by scan.

The arithmetic controller 16 performs the following computation processing. The waveform of the induced signal of each sensing line produced from the A/D converter 15 varies as shown in FIG. 2. The reason of the distribution of the induced signal will be described as follows.

Figure 4A:
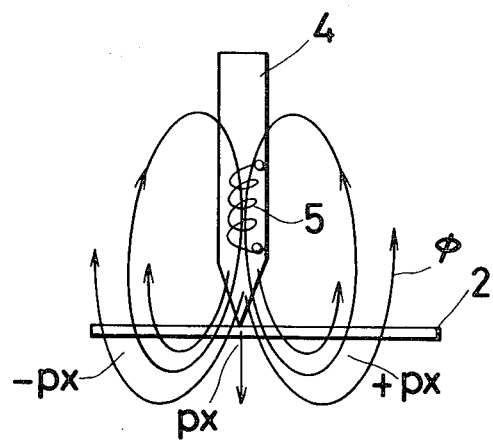
FIGS. 4A and 4B are explanatory drawings of the magnetic flux generated from the coordinate indicator.
Figure 4B:
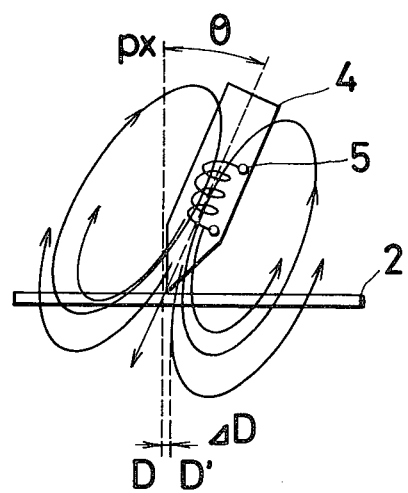

FIGS. 4A and 4B are explanatory drawings showing the magnetic flux φ generated from the exciting winding 5 of the coordinate indicator 4 and passing through the substrate 2 on which the sensing lines are installed. If the X-axis sensing lines are installed in the vertical direction of the drawings, the portion PX generates the maximum voltage signal $V_{PX}$, and the portion −PX and +PX generate the secondary peak voltages values $V_{-PX}$ and $V_{+PX}$ at both sides of $V_{PX}$. Namely, the secondary peak values generate by folding the magnetic flux φ.

If the coordinate indicator 4 inclines to the righthand side at an angle θ as shown in FIG. 4B, the detected position found by the computed value $$Q = \frac{V_{PX} - V_{P+1X}}{V_{PX} - V_{P-1X}} \quad (V_{P+1X} \geq V_{P-1X})$$

is a point D' which shifts by an amount ΔD even if the actually indicated point is the point D, because the Q value decreases due to an increase of $V_{P+1X}$ (the detection signal of the sensing line at the right-hand side of $V_{PX}$) and a decrease of $V_{P-1X}$ according to the inclination of the coordinate indicator 4.

However, the reading difference in the above ΔD can be offset or compensated by using the secondary peak values which increase and decrease according to the inclination angle θ of the coordinate indicator 4.

First, the coordinate value is computed from the Q value represented by:
$Q = (V_{PX} - V_{P+1X})/(V_{PX} - V_{P-1X})$, (in the case where $V_{P+1X} \geq V_{P-1X}$), using the primary peak voltage $V_{PX}$ and the induced voltage signals $V_{P+1X}$, $V_{P-1X}$ at both sides thereof. Simultaneously, the sign of $V_{+PX} - V_{-PX}$ is discriminated to detect the inclination direction of the coordinate indicator 4.

In the case of FIG. 2, the afore-mentioned value is positive since the secondary peaks are $V_{+PX} > V_{-PX}$ and the coordinate indicator 4 inclines to the right side relative to the X-axis. Next, f(θ) is computed. f(θ) is represented by;

$$f(\theta) = \left| \frac{V_{+PX} - V_{-PX}}{V_{+PX} + V_{-PX}} \right|$$

f(θ) is determined by inclination θ of the coordinate indicator 4, and the amount of error of the computed position corresponding to f(θ) is entirely memorized in a ROM of the memory circuit 18. The accurately indicated coordinate value is computed by adding or subtracting the amount of error found by f(θ) to or from the coordinate position found by the Q value. It is to be noted that although the above computation is described only with respect to the X-axis, it is also performed with respect to the Y-axis as well.

In the case of the induced voltage signals in FIG. 2, the relation between $V_{P+1X}$ and $V_{P-1X}$ is represented by; $V_{P+1X} > V_{P-1X}$, although the point of the coordinate indicator is actually on the sensing line from which $V_{PX}$ is detected, since it inclines relative to the X-axis by about θ=20°. So the coordinate computed by the Q-value shifts to the side of the sensing line from which the induced signal $V_{P+1X}$ is detected. Accordingly, the accurately indicated coordinate is found by subtracting the amount of the error found by the f(θ) value.

Table 1 shows the actually measured value according to the embodiment of the present invention and the actually measured value without compensation.

TABLE 1

| | | | | | | |
|---|---|---|---|---|---|---|
| Compensated | Inclination Angle (degree) | 0 | 10 | 20 | 30 | 40 |
| | Measured Value (mm) | 201.4 | 201.4 | 201.5 | 201.6 | 201.6 |
| | The Amount of Shift (mm) | 0 | 0 | 0.1 | 0.2 | 0.2 |
| Without Compensation | Measured Value (mm) | 201.4 | 201.8 | 202.2 | 202.7 | 203.0 |
| | The Amount of Shift (mm) | 0 | 0.4 | 0.8 | 1.3 | 1.6 |

Table 1 shows the data in the case the point of the coordinate indicator is inclined in the direction of the X-axis at the X-axis coordinate point 201.4 mm. In the case without compensation, the measured value increases in accordance with the inclination angle as shown in the lower column, and the amount of shift is 1.6 mm when θ=40°. On the contrary, in the case the error of inclination is compensated according to the present invention, the amount of shift is less than 0.2 mm as shown in the upper column. Further although not shown, the dispersion according to the measured position is exceedingly small.

As illustrated above, the present invention provides the arithmetic control unit which corrects the inclination of the coordinate indicator by computing the error of inclination by using f(θ) independent of the Q-valve. As the result, the error of inclination of the coordinate indicator can be compensated even if the sensing line of the primary peak shifts to the next because of a steep inclination. Accordingly the coordinate indicator of the present invention is capable of determining the coordinate accurately and constantly regardless of the inclination of the coordinate indicator. Further, since f(θ) is the value which divides the subtraction of the two secondary peaks by the addition thereof, the coordinate is determined only by the difference of the inclination θ regardless of the signal level. Consequently the error of the values caused by the inclination can be compensated accurately, and the error of inclination can be eliminated if the capacity of ROM is enlarged.

We claim:

1. A coordinate determining device comprising: a tablet having a plurality of sensing lines disposed thereon and spaced from each other; a coordinate indicator having a coil and being movable and inclinable relative to the tablet for indicating a coordinate on the tablet; means for generating an alternating magnetic field from the coil to induce electromotive voltages within the sensing lines; means for detecting the induced electromotive voltage generated from each of the sensing lines by scanning them in turn; and arithmetic control means for computing the position of the coordinate indicator by detecting the maximum voltage value of the detection signals generated in the sensing lines and the voltage values of the detection signals of the sensing lines neighboring the sensing line which generates the maximum voltage value detection signal, said arithmetic control means including means for detecting the secondary peak voltage values of the voltages within sensing lines remote from the sensing line having the maximum voltage value, and means to compensate for an error of the computed position caused by an inclination of the coordinate indicator relative to the tablet by using the detected secondary peak voltage values of the voltages within sensing lines remote from the sensing line having the maximum voltage value.

2. A coordinate determining device according to claim 1 wherein said arithmetic control means includes means for discriminating the direction of inclination of said coordinate indicator by using two secondary peak voltage values of the detection signals, and a memory circuit for memorizing two values one of which is found by dividing the difference of the two secondary peak values by the sum thereof and the other of which is the corresponding differences between the position actually indicated by the coordinate indicator and the computed position, and wherein the detected voltage values of the voltages within the sensing lines adjacent the sensing line having the maximum voltage value $V_{PX}$ are respectively $V_{P-1X}$ and $V_{P+1X}$, and wherein said arithmetic control means includes means to compute a position parameter $Q=(V_{PX}-V_{P+1X})/(V_{PX}-V_{P-1X})$ and to determine the position of said coordinate indicator relative to the sensing line having the maximum voltage value based on the computed value of the position parameter Q, and wherein the detected voltage values of the voltages within the sensing lines remote from the sensing line having the maximum voltage value are respectively $V_{+PX}$ and $V_{-PX}$, and wherein said arithmetic control means includes means to compute a correction parameter $f=|(V_{+PX}-V_{-PX})/(V_{+PX}+V_{-PX})|$ and to determine a position error correction value from the computed value of the parameter f.

3. A coordinate determining device comprising: a tablet comprised of a substrate having a major surface, and a plurality of conductive sensing lines disposed on the major surface of said substrate and regularly spaced to define a coordinate axis and distances along the coordinate axis; a coordinate indicator having field generating means for generating a time-varying magnetic field, said coordinate indicator being positionable and inclinable relative to said sensing lines to enable the field generating means to induce electromotive voltages within said sensing lines; means for sequentially measuring the amplitude of the electromotive voltages in successive ones of said sensing lines; and arithmetic control means for detecting the value of the maximum voltage within said sensing lines and the values of the voltages within sensing lines on opposite sides of and proximate to the sensing line having the maximum voltage value and operative to compute therefrom the position of said coordinate indicator relative to said sensing line having the maximum voltage value, and for detecting the values of the voltages within sensing lines on opposite sides of and remote from the sensing line having the maximum voltage value and operative to compute therefrom a position error correction so as to compensate for an error of the computed position caused by an inclination of the coordinate indicator relative to the tablet.

4. A coordinate determining device according to claim 3; wherein the detected voltage values of the voltages within the sensing lines remote from the sensing line having the maximum voltage value are respectively $V_{+PX}$ and $V_{-PX}$, and wherein said arithmetic control means includes means to compute a correction parameter $f=|(V_{+PX}-V_{-PX})/(V_{+PX}+V_{-PX})|$, and means to determine a position error correction value from the computed value of the parameter f.

5. A coordinate determining device according to claim 3; wherein the detected voltage values of the voltages within the sensing lines adjacent the sensing line having the maximum voltage value $V_{PX}$ are respectively $V_{P-1X}$ and $V_{P+1X}$, and wherein said arithmetic control means includes means to compute a position parameter $Q=(V_{PX}-V_{P+1X})/(V_{PX}-V_{P-1X})$ and to determine the position of said coordinate indicator relative to the sensing line having the maximum voltage value based on the computed value of the position parameter Q, wherein the detected voltage value of the voltages within the sensing lines remote from the $V_{+PX}$ and $V_{-PX}$, and wherein said arithmetic control means includes means to compute a correction parameter $f=|(V_{+PX}-V_{-PX})/(V_{+PX}+V_{-PX})|$ and to determine a position error correction value from the computed value of the parameter f.

* * * * *